Aug. 6, 1946.   W. GIGER   2,405,352
DUAL POWER THERMAL LOCOMOTIVE
Filed Feb. 26, 1944

Inventor:
Walter Giger,
By Pierce & Scheffler
Attorneys.

Patented Aug. 6, 1946

2,405,352

UNITED STATES PATENT OFFICE 2,405,352

DUAL POWER THERMAL LOCOMOTIVE

Walter Giger, Zurich, Switzerland, assignor to Aktiengesellschaft Brown, Boveri & Cie., Baden, Switzerland Application February 26, 1944, Serial No. 524,107
In Switzerland February 26, 1943

3 Claims. (Cl. 290—3)

On certain railways which are generally operated with thermal locomotives, it can happen, particularly in the neighbourhood of towns, that relatively short sections of line which are arranged underground, have to be electrified because traffic with any kind of thermal locomotive is prohibited on account of the hot exhaust gases which pollute the atmosphere. From the operational point of view an interruption of the journey and especially a change in locomotives is, however, very undesirable because time is lost and a second locomotive is required to take the train through the tunnel section. It is therefore desirable that the locomotives used for such railways should be constructed as dual power machines so that they can generally be operated thermally but in an emergency can be connected up to an electrical traction supply system and then operate as purely electrical locomotives.

The present invention deals with such a dual power thermal locomotive with electrical transmission, particularly a gas turbine electric locomotive, in which the thermal plant drives over a gearing two main generators, each of which feeds a set of traction motors, the plant being constructed in such a manner that it can be readily switched over from thermal operation to purely electrical operation with a direct-current traction supply network. According to the invention when switching over the locomotive from thermal to purely electrical operation a coupling located between the gearing and the thermal plant is disengaged and at the same time one of the main generators is connected to the network, whilst all the traction motors are electrically coupled to the other main generator which during network operation is driven over the gearing by the generator which now operates as a motor.

Figure 1:
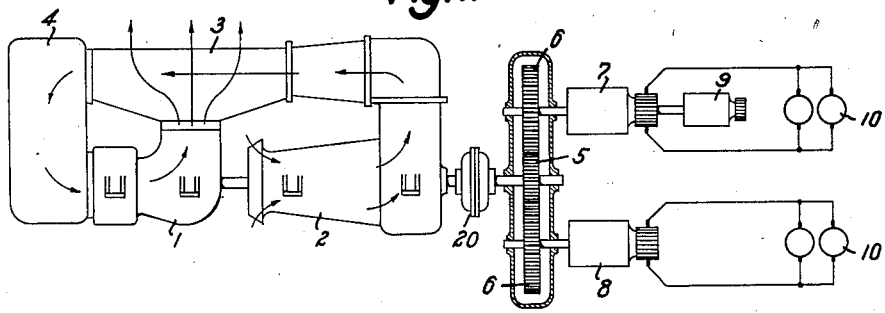
Figure 2:
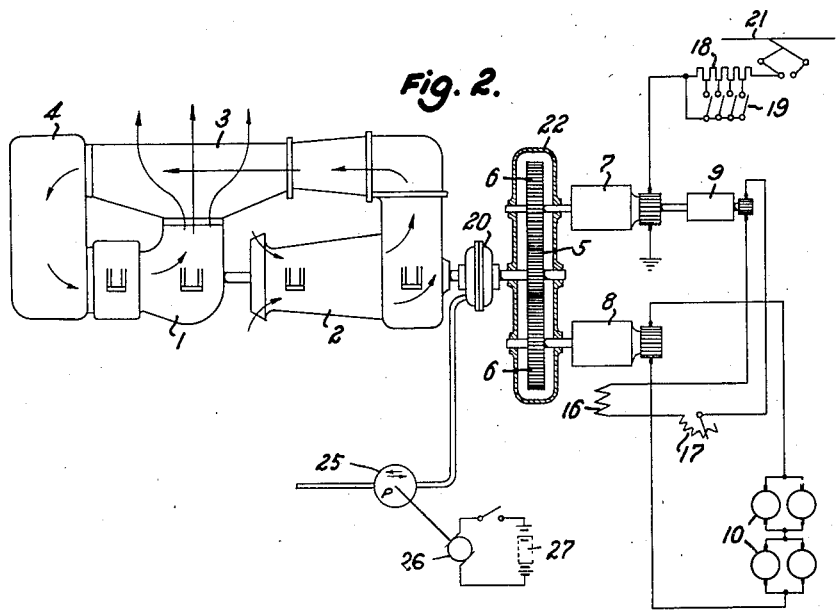

Fig. 1 of the accompanying drawing shows the fundamental arrangement of a gas turbine installation with electrical transmission as applied to a locomotive, whilst Fig. 2 shows how the same plant must be altered in accordance with the invention so that it can also be operated from a direct-current traction supply network.

In Fig. 1 reference numeral 1 indicates the gas turbine which drives a compressor 2, this latter supplying through an air-preheater 3 the air required for combustion in the combustion chamber 4. The driving gases for the turbine 1 are obtained from the combustion chamber 4. Both machines 1, 2 are rigidly coupled together, and the turbine 1 drives over the pinion 5 and the two gear wheels 6 the two main generators 7 and 8 which deliver their electrical power to the traction motors 10; 9 is an excitation generator which supplies current for the excitation of the main generators and the auxiliaries. Normally each generator 7 and 8 supplies one group of traction motors 10 each consisting for instance of two motors.

By means of very simple constructional alterations it is easily possible to design the plant shown in Fig. 1 in such a manner that it can also operate on sections with direct-current electrified networks without having to use the gas turbine. For this purpose therefore according to the invention the plant is constructed as shown in Fig. 2. Identical elements in both figures are indicated by the same reference numerals.

Main generators 7, 8 and traction motors 10 are designed for about the same direct-current voltage as that of the traction supply network 21. Before the train, that is to say the locomotive, enters the electrified section (for instance a tunnel), a coupling 20 located between the compressor 2 and the gearing 22 is disengaged and by means of starting resistances 18 and relays 19 the main generator 7 is connected to the overhead line or contact rail 21, this switching-over process requiring very little time because when switching-over the set still runs at normal no-load speed. At the same time as generator 7 is switched-over to the network 21 all traction motors 10 are electrically coupled with the other generator 8. Since the output of generator 8 only amounts to half the locomotive power it is preferable that the traction motors 10 should be connected in series. In this way it is possible for the locomotive to transport the train over the electrified sections with undiminished traction but at half speed, which in view of the comparative shortness of the electrified sections is not considered a disadvantage. Whilst operating as a converter-locomotive where generator 7, which operates as a motor, is supplied from network 21 and drives generator 8 over gearing 22, the speed of the traction motors 10 is regulated in exactly the same way as during thermal operation by altering the excitation of generator 8 by means of a field rheostat 17 which is arranged in series with the excitation winding 16.

Due to the provision of coupling 20, motor or generator 7 is prevented from also driving the gas turbine plant during purely electrical operation, because this would absorb a considerable amount of no-load power.

If the locomotive has to be started whilst the train is on an electrified section, generator group 7, 8 is first of all started from the supply network 21 with the aid of the aforementioned starting resistances 18 and relays 19, coupling 20 being disengaged during this process. Since the generators are started up at no-load and therefore accelerate rapidly, three to four starting resistance steps are adequate. By this means when operating with current supplied from network 21 all complicated and expensive starting devices can be dispensed with.

In order to enable the gas turbine plant to be started whilst generator 7 operating as a motor still drives the locomotive, it is expedient to construct coupling 20 in such a manner that it can be gradually engaged, for instance as a liquid coupling. When starting up the gas turbine set, the coupling is then gradually filled by a small pump 25 driven by motor 26 from the battery 27 of the locomotive so that the gas turbine set rapidly attains ignition speed. As soon as gas turbine 1 receives motive gases from combustion chamber 4 after ignition has occurred it accelerates itself and can then be rigidly coupled with generators 7, 8. Generator 7 is simultaneously disconnected from network 21 and generators 7, 8 as well as traction motor groups 10 are switched over so that the arrangement shown in Fig. 1 is again obtained, where generators 7, 8 are again driven by gas turbine 1 and the traction motors 10 are supplied with full power.

On a thermally operated section of the line where there is no power supply 21 the gas turbine set is started in a known manner with a small Diesel-generator set which by means of one of the generators 7 or 8 brings the gas turbine set up to ignition speed, whereupon it accelerates itself up to no-load speed, coupling 20 being engaged during this operation.

I claim:

1. In a dual power electric locomotive, a thermal power plant, a pair of main direct current generators, gearing connecting said generators, and a hydraulic clutch for coupling said power plant to said gearing to drive said generators, whereby upon disengagement of the clutch one of said generators may be operated as a motor to drive the other generator through said gearing.

2. In a dual power electric locomotive, the invention as recited in claim 1 wherein said clutch is connected to a pump operable independently of the current developed by said generator for filling and emptying said hydraulic clutch.

3. In a dual power electric locomotive, the invention as recited in claim 1, wherein said thermal power plant is a combustion gas turbine which may be started during operation of one main generator as a motor by gradually filling said hydraulic clutch to bring said combustion gas turbine up to ignition speed.

WALTER GIGER.